United States Patent [19]

Schaller et al.

[11] Patent Number: 4,851,756
[45] Date of Patent: Jul. 25, 1989

[54] PRIMARY-SECONDARY HYBRID BATTERY

[75] Inventors: David R. Schaller, Janesville, Wis.; George R. Menkart, Forest, Va.; Loring C. Hall, Middleton; Robert J. Bosben, Madison, both of Wis.

[73] Assignee: Rayovac Corporation, Madison, Wis.

[21] Appl. No.: 1,457

[22] Filed: Jan. 8, 1987

[51] Int. Cl.$^4$ .............. H02J 7/00; H02J 9/06
[52] U.S. Cl. ........................... 320/3; 307/46; 307/66; 320/6; 320/15
[58] Field of Search .................. 320/2-4, 320/15; 307/46, 48, 65, 66

[56] References Cited

U.S. PATENT DOCUMENTS

| | | | |
|---|---|---|---|
| 3,305,725 | 2/1967 | Huge et al. | 307/46 |
| 3,555,290 | 1/1971 | Ellermeyer | 306/65 |
| 4,009,051 | 2/1977 | Kazis et al. | 320/15 |
| 4,061,956 | 12/1977 | Brown et al. | 320/23 X |
| 4,327,298 | 4/1982 | Burgin | 307/66 |
| 4,342,922 | 8/1982 | DiMassimo et al. | 307/66 |
| 4,441,031 | 4/1984 | Moriya et al. | 307/46 X |
| 4,667,142 | 5/1987 | Butler | 320/2 X |
| 4,675,538 | 6/1987 | Epstein | 307/150 X |

OTHER PUBLICATIONS

Fordham 1984 Catalog, p. 155, "Sanyo Personal Cassette Player," 1983.

Primary Examiner—R. J. Hickey
Attorney, Agent, or Firm—Kenyon & Kenyon

[57] ABSTRACT

A hybrid battery which provides back-up energy for a main power source to a load. The hybrid battery comprises a rechargeable nickel cadmium battery, a primary lithium battery and a power transistion circuit for controlling the supply selection to the load based on the highest voltage available. The hybrid battery further comprises a charge controller circuit for recharging the nickel cadmium battery from the main power source. Both the power transition circuit and the charge controller circuit isolate each of the energy sources from one another preventing draining whenever one or more of the power sources are off.

22 Claims, 5 Drawing Sheets

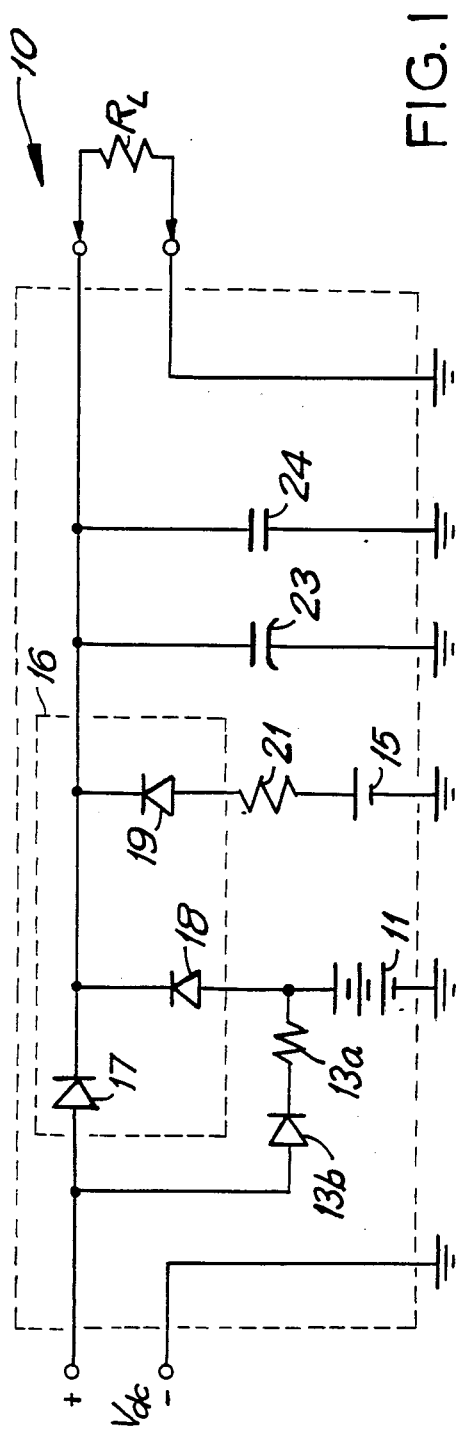
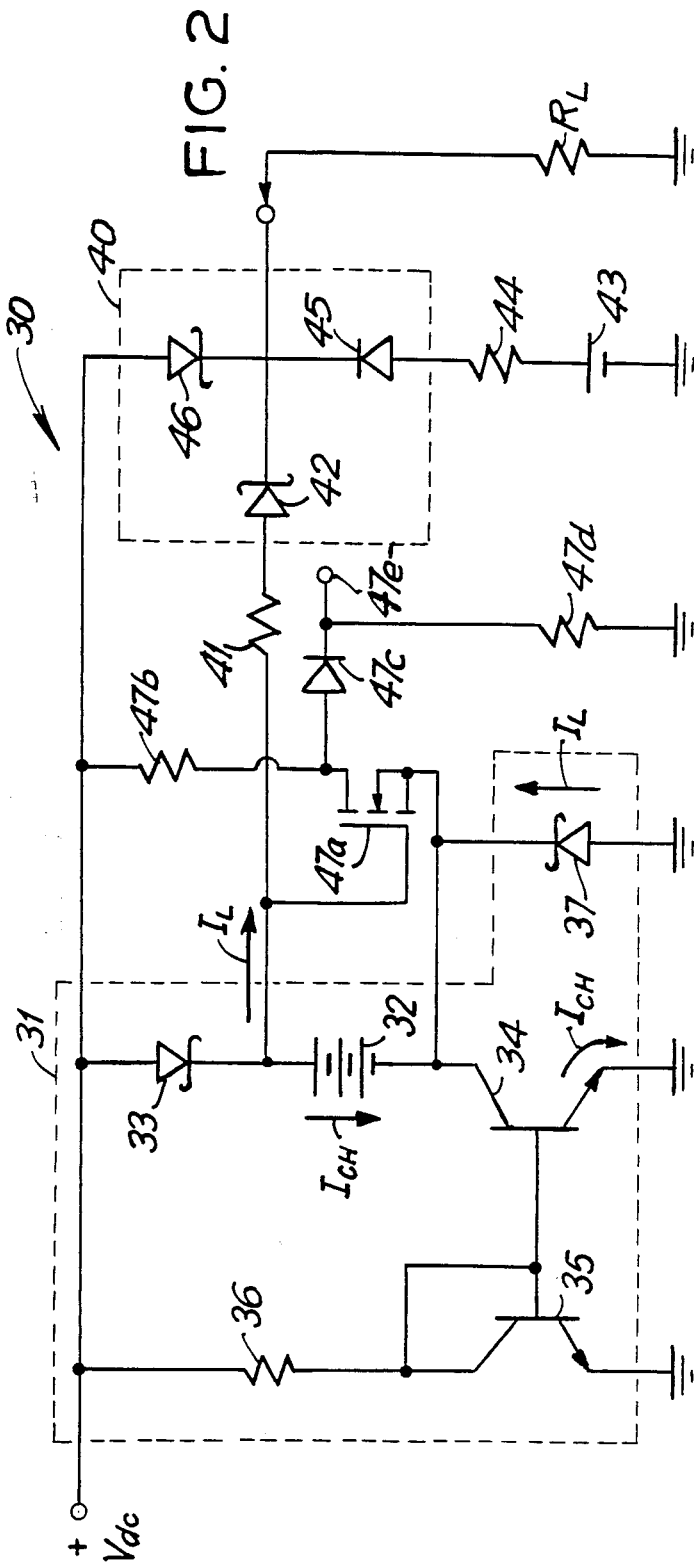
FIG.1
FIG.2

PRIMARY-SECONDARY HYBRID BATTERY

TECHNICAL FIELD

The invention relates generally to a hybrid battery system. In particular, the invention relates to a primary-secondary hybrid battery system which provides back-up energy for a main power source.

BACKGROUND OF THE INVENTION

In many devices which use batteries, there often arises the need to have an auxiliary power source to back up the main battery. An example of such an application are children's toys which use alkaline batteries to charge nickel cadmium batteries functioning as the main power source. Other applications include dual chemistry systems in which rechargeable batteries recharge other rechargeable batteries.

Problems arise however in combining different battery types in order to provide an auxiliary power source. Although hybrid battery systems often exhibit the combined advantages of the different battery types, the same systems can also exhibit the combined disadvantages of the different battery types. Secondly, in many applications the main power source may become over-discharged and cannot be immediately recharged by the backup power source. The configuration of many hybrid battery systems are not useful in those applications.

Other problems also exist for products relying on rechargeable nickel cadmium batteries for operating and/or backup energy. Such products often require a trade-off between charger cost, battery life and availability of stored energy. To minimize the exposure inherent in periods in which the nickel cadmium battery is in a discharged or semi-discharged state, a high charge rate is needed. The high charge rate, which prevents a shortened nickel cadmium battery life, is usually provided by a complex and costly multi-rate charger. Secondly, in applications in which the discharge time may extend beyond the time for which sized, multi-cell nickel cadmium batteries may be drawn down to a point at which a cell is driven in reverse, thus, shortening the battery life. Finally, rechargeable nickel cadmium batteries have required a higher charging voltage than the source inherently available in the device into which they are designed. For example, a 3.6 volt nickel cadmium battery needs more than 5.0 volts if it is to be reliably charged with systems now existing in the art.

SUMMARY OF THE INVENTION

The foregoing problems are obviated by the present invention, comprising:
(a) a rechargeable first battery;
(b) a second battery; and
(c) means for selectively connecting the rechargeable first battery, the second battery and at least one external power source based on which source has the highest voltage available.

The invention provides a hybrid battery configuration in combination with interfacing control circuitry which produces a fully coordinated rechargeable power supply. The control circuitry assures a charge voltage which leads to efficient, reliable charging of the rechargeable first battery at a low life extending rate. The back-up second battery prevents dangerous over-discharge of the rechargeable first battery even as it delivers reserve energy during the occasional discharge periods longer than those for which the rechargeable battery is sized. Reliable, rechargeable energy storage capability can also be provided by the appropriate interfacing control circuitry and properly sized batteries.

BRIEF DESCRIPTION OF THE DRAWINGS

For a better understanding of the invention, reference is made to the following description of exemplary embodiments thereof, and to the accompanying drawings, wherein:

FIG. 1 is an electrical schematic diagram of a hybrid battery of the invention;

FIG. 2 is an electrical schematic diagram of a hybrid battery of the invention having a low drop-out voltage current regulator;

DETAILED DESCRIPTION

Figure 3:
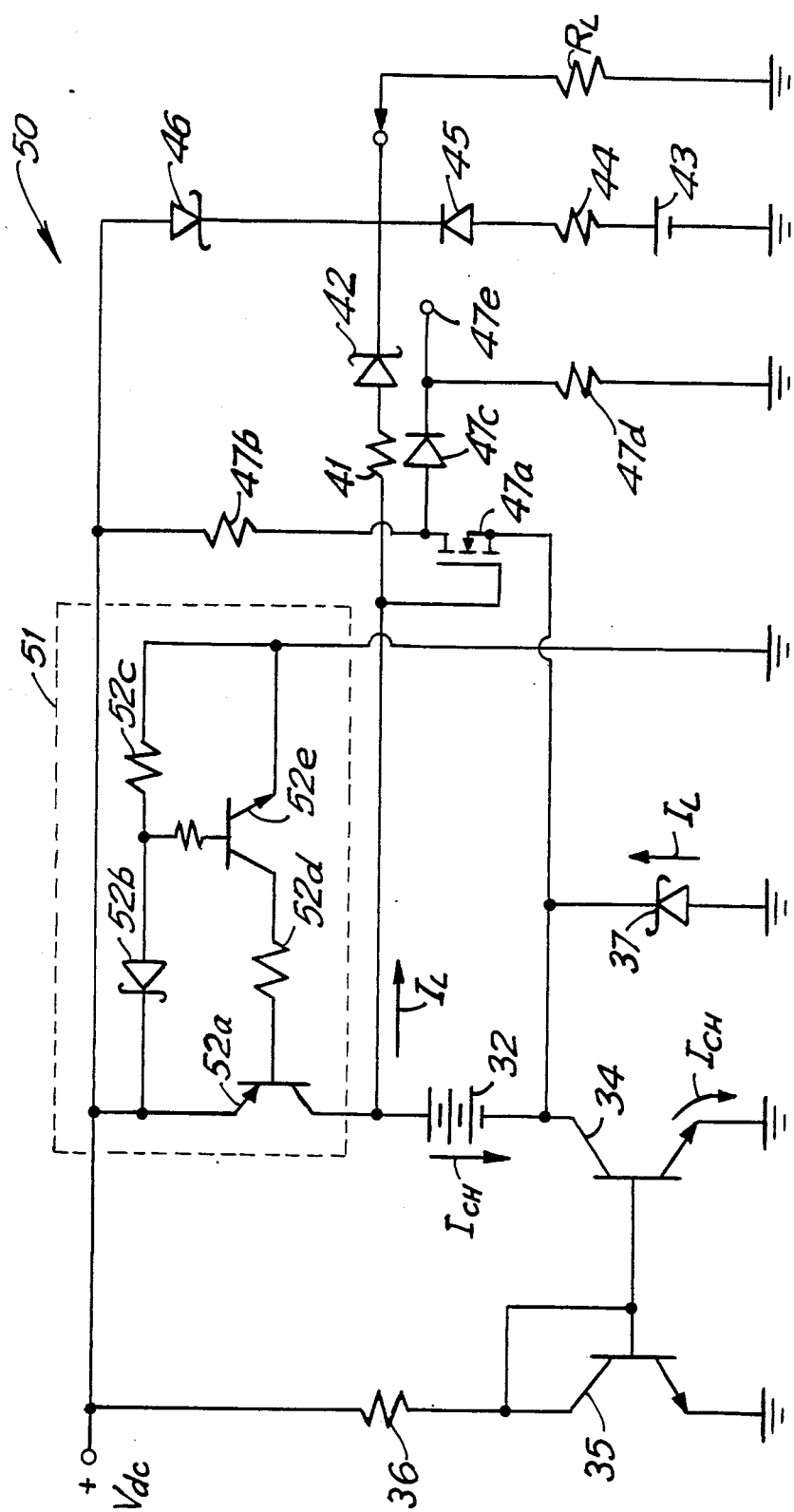
FIG. 3 is an electrical schematic diagram of a second embodiment of a hybrid battery of the invention having a low drop-out voltage current regulator.

FIG. 1 shows an electrical schematic diagram of a primary-secondary hybrid battery 10 having an input tied to a main DC power source $V_{dc}$ and an output tied to a load resistance $R_L$. The hybrid battery 10 comprises a rechargeable battery 11, such as a three-cell nickel cadmium battery, which has a positive terminal tied to the positive terminal of the main DC power source $V_{dc}$ via a charge controller circuit, shown in FIG. 1 as a resistor 13a-diode 13b series. The hybrid battery 10 further comprises a primary battery 15, such as a lithium polycarbon monofluoride battery, and a power transition circuit 16 which connects the main DC power source $V_{dc}$, the rechargeable battery 11 and the primary battery 15 to the load resistance $R_L$ via respective diode switches 17, 18, 19. Note that the primary battery 15 is tied to the transition circuit 16 via a current-limiting resistor 21 which may be excluded from the circuit.

In operation, the power transition circuit 16 automatically connects the load resistance $R_L$ to one of the three power sources based on the highest voltage available. Normally, the load resistance $R_L$ first receives operating power from the main DC power source $V_{dc}$ via the first diode switch 17. When the main DC power is on, the rechargeable battery 11 is energized, or charged, from the main DC power source $V_{dc}$ via the resistor 13a-diode 13b series. Note that the resistor 13a acts as to limit current and the diode 13b provides voltage isolation during a recharging of the rechargeable battery 11. Should the main DC power be lost, the rechargeable battery 11 would continue to supply power to the load resistance $R_L$ via the second diode switch 18. A typical nickel cadmium battery will usually supply 3.6 volts. During a very long main DC power loss, the primary battery 15 will be gradually engaged through load sharing with the rechargeable battery 11. This transition occurs when the rechargeable battery 11 has discharged to a predetermined voltage, e.g., 2.5 volts. Once the primary battery 15 has completely engaged, the voltage of the rechargeable battery 11 will continue to drop through self-discharge. At this point, since no current is flowing the cells of the rechargeable battery 11 can discharge to 0 volts without risk of damaging cell reversal.

The diode 13b of the charge controller circuit and the first diode switch 17, which are both directly tied to the main DC power source $V_{dc}$, isolate the main DC power source from draining the rechargeable battery 11 and/or the primary battery 15 when the main DC power is off. The second diode switch 18 which ties the rechargeable battery 11 to the load resistance $R_L$ prevents the primary battery 15 from draining into the rechargeable battery 11. The third diode switch 19 which ties the primary battery 15 to the load resistance $R_L$ prevents charge current from entering into the primary battery 15. Note, however, that such a diode switch 19 may not be necessary in variations of the hybrid battery 10 which substitute a rechargeable battery for the primary battery 15.

The hybrid battery 10 can also be equipped with shunt capacitors 23, 24 which connect across the load resistance $R_L$. A first shunt capacitor 23 can be an electrolytic capacitor which lowers overall internal impedance at low frequencies. A second shunt capacitor 24 can be a ceramic or stacked film-type capacitor which lowers internal impedance at high frequencies. Both capacitors are optional circuit elements and are not required for the operation of the hybrid battery 10.

The hybrid battery 10 can be constructed as one integral module which can be disposable or can be constructed with either or both battery types 11, 15 as being replaceable. Variations of the hybrid battery 10 combine two batteries of different chemistries and/or different voltages such that one takes over for the other automatically as in the hybrid battery 10 described above. Another variation of the hybrid battery 10 utilizes two main DC power sources of different voltages.

FIG. 2 shows an embodiment of a hybrid battery 30 which incorporates a charge controller circuit 31 that provides current regulation for the recharging of a rechargeable battery 32. The positive terminal of a rechargeable battery 32, such as a three-cell nickel cadmium battery, is tied to the positive terminal of the main DC power source $V_{dc}$ at the battery's input via a first Schottky diode 33 which provides voltage isolation therebetween. The negative terminal of the rechargeable battery 32 is tied to the collector of a first common-emitter NPN transistor 34 of a conventional current mirror. The current mirror comprises the first transistor 34 tied to a second common-emitter NPN transistor 35 in back to back fashion (i.e., the bases of the two transistors are tied together). The collector of the second transistor 35 is tied to the positive terminal of the main DC power source $V_{dc}$ via a collector resistor 36. The final element of the charge controller circuit 31 is a second Schottky diode 37 connected between the collector of the first transistor 34 and ground. Note that the base and collector of the second transistor 35 are tied together.

A power transition circuit 40 utilizes conventional diode steering to provide the hybrid battery 30 with supply selection for the load resistance $R_L$ at the battery's output. The load resistance $R_L$ is tied to (a) the positive terminal of the rechargeable battery 32 via a resistor 41 and a first Schottky diode 42; (b) a primary battery 43, such as a lithium battery, via a current-limiting resistor 44 and a diode 45; and (c) the positive terminal of the main DC power source $V_{dc}$ via a second Schottky diode 46.

Also shown in FIG. 2 is a battery-short indicating circuit comprising a MOSFET transistor 47a having a gate tied to the positive terminal of the rechargeable battery 32, a source and substrate tied to the negative terminal of the rechargeable battery 32 and a drain tied to the positive terminal of the main DC power source $V_{dc}$ via a resistor 47b. The drain of the MOSFET transistor 47a is also tied to a diode 47c which, in turn, is tied to ground via a resistor 47d as well as to a battery-short terminal 47e.

In operation, the hybrid battery 30 operates in the same fashion as described previously. The main DC power source $V_{dc}$ feeds operating power to the load resistance $R_L$ via the second Schottky diode 46 of the power transition circuit 40. Should the main DC power be lost, the rechargeable battery 32 will provide load current $I_L$ through the resistor 41 and the first Schottky diode 42 of the power transition circuit 40 to the load resistance $R_L$. During a very long main DC power loss, the primary battery 43 will be gradually engaged through load sharing with the rechargeable battery 32. Note that the use of Schottky diodes, although not necessary, is advantageous to the operation of the circuitry because of the low voltage drops associated therewith.

When the main DC power is on, the hybrid battery 30 uses the charge controller circuit 31 to provide a regulated charge current $I_{CH}$ to the rechargeable battery 32 with a very small available voltage differential (i.e., drop-out voltage). Current regulation, while not ordinarily required in charging a rechargeable battery 32 in situations with reasonable values of voltage differential available does become extremely important for small values of changing voltage differential. For instance, suppose that the main DC power source $V_{dc}$ is a 5 volt supply having a 5% tolerance, or a range of 4.75 volts to 5.25 volts which is prevalent in electronic systems. With a conventional hybrid battery system of any available type previously known, voltage isolation for a three-cell battery 32, as provided by the first Schottky diode 33 with its accompanying voltage drop, would not be functional at the indicated voltage range owing to the extremely low series resistor value required. This would yield unacceptably high charge currents at the high end of the voltage range.

The hybrid battery 30 makes use of two separate paths for the rechargeable battery 32 current. The regulated charge current $I_{CH}$ flows from the main DC power source $V_{dc}$ through the first transistor 34 of the current mirror whereas a load current $I_L$ flows from the grounded second Schottky diode 37 to the load resistance $R_L$. Thus, the low voltage required to operate a common-emitter transistor, such as, the first transistor 34, allows operation at a low differential voltage between a source (i.e., the main DC power source $V_{dc}$) and a load (i.e., the rechargeable battery 32). The isolating first Schottky diode 33 prevents discharge of the rechargeable battery 32 when the main DC power source $V_{dc}$ is interrupted, e.g. main DC power is off, by blocking current flow from the rechargeable battery 32 through the dead supply which would otherwise flow.

For extremely low drop-out voltage current regulation, the isolating first Schottky diode 33 can be replaced with a transistor switch 51 as shown in FIG. 3. The transistor switch 51 comprises a PNP transistor 52a having its collector tied to the positive terminal of the rechargeable battery 32 and its emitter tied to the main DC power source $V_{dc}$. The emitter of the transistor 52a is also tied to ground via a Zener diode 52b and a first resistor 52c. The base of the transistor 52a is tied, via a second resistor 52d, to the collector of a NPN transistor 52e whose emitter is tied to ground. The base of the NPN transistor 52e has a base resistor 52f tied to the circuit connection between the Zener diode 52b and the first resistor 52c.

Figure 4:
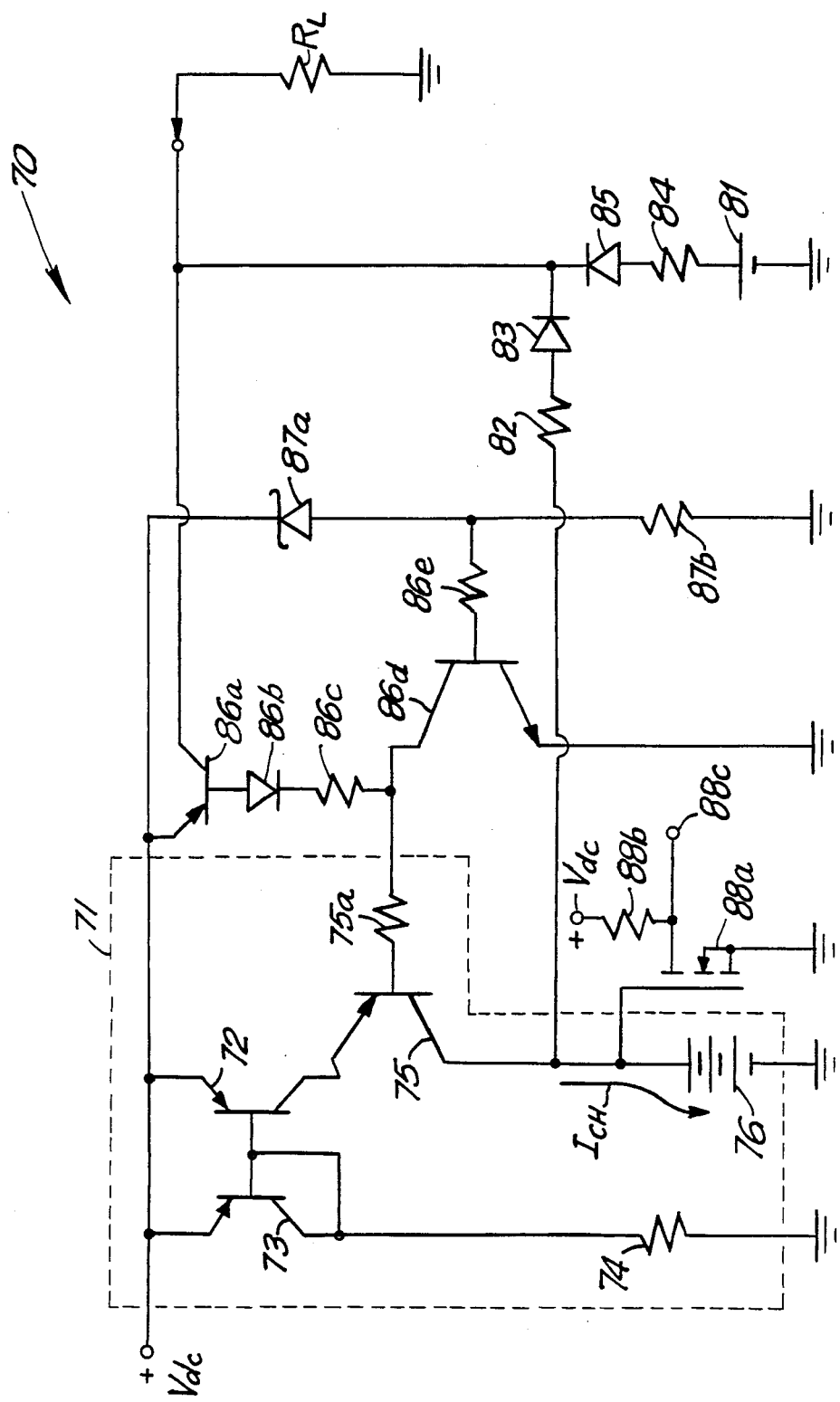
FIG. 4 is an electrical schematic diagram of a third embodiment of a hybrid battery of the invention having a low drop-out voltage current regulator.

FIG. 4 shows a variation of a hybrid battery 70 having a charge controller 71 circuit. The positive terminal of the main DC power source $V_{dc}$ is tied to the emitters of a first PNP transistor 72 and a second PNP transistor 73 which form a conventional current mirror. The collector of the second transistor 73 is tied to ground via a resistor 74. The collector of the first transistor 72 is tied to the emitter of a third PNP transistor 75 which functions as a saturated transistor switch during charging. The base of the third transistor 75 is tied to a resistor 75a and the collector is tied to the positive terminal of a rechargeable battery 76, such as a three-cell nickel cadmium battery. Note that the base and collector of the second transistor 73 are tied together.

A power transition circuit (not delineated in FIG. 4) utilizes conventional diode steering to provide supply selection for the load resistance $R_L$ only as between the rechargeable battery 76 and a primary battery 81, such as a lithium battery. The load resistance $R_L$ is tied to the positive terminal of the rechargeable battery 76 via a resistor 82 and a diode 83 and to that of the primary battery 81 via a current limiting resistor 84 and a diode 85. The main DC power source $V_{dc}$, however, is tied to the load resistance $R_L$ via the emitter-collector path of a PNP transistor 86a. The base of the transistor 86a is tied to the base resistor 75a of the third PNP transistor 75 via a diode 86b-resistor 86c combination. The base resistor 75a is also tied to the collector of a common-emitter NPN transistor 86d having a base resistor 86e tied to the main DC power source $V_{dc}$ via a Zener diode 87a and to ground via a resistor 87b.

Also shown is a battery-short indicating circuit comprising a MOSFET transistor 88a having a gate tied to the positive terminal of the rechargeable battery 76, a source and substrate tied to ground and a drain tied to the main DC power source $V_{dc}$ via a resistor 88b. The drain of the MOSFET transistor 88a is also tied to a battery-short terminal 88c.

In operation, the hybrid battery 70 operates in the same fashion as previously described. However, the operation of the charge controller 71 shown in FIG. 4 has two modes. The third PNP transistor 75, which is utilized as a saturated transistor switch, is saturated, or fully on, for all operating modes and may yield 0.1 volts or lower when operating. The transistors 72, 73 of the current mirror provide regulated charge current as set by the collector resistor 74 according to the following equation: $I_{CH} = (V_{dc} - V_{BE})/R_{74}$, where $I_{CH}$ is the amount of current flowing to the rechargeable battery 76 during charging, $V_{BE}$ is the base-emitter voltage of the second transistor 73 of the current mirror and $R_{74}$ is the resistance value of the collector resistor 74 of the second transistor 73. The current mirror provides the regulated charge current $I_{CH}$ in the normal operation mode and yields operation at very low values of the main DC power source $V_{dc}$ (relative to the rechargeable battery 76 voltage). However, as even lower values of the main DC power source $V_{dc}$ are used, charging of the rechargeable battery 76 is still possible due to the common-emitter characteristics of the first PNP transistor 72 which goes into saturation rather than normal current mirror operation. By this means, some charging is possible for extremely low voltage differentials between the rechargeable battery 76 and the main DC power source $V_{dc}$. When high charge currents are required for the rechargeable battery 76 or more efficient charging is desired, several mirror transistors can be used in combination or mirror transistors with different emitter junctions can be used, or both.

Figure 5:
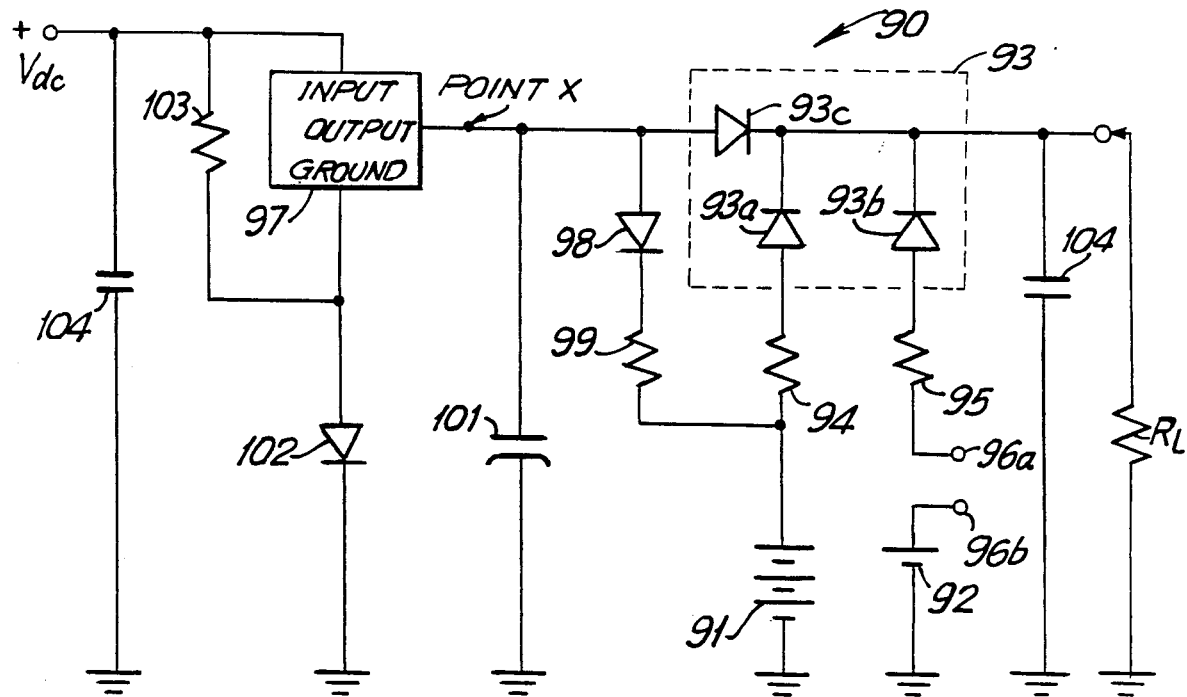
FIG. 5 is an electrical schematic diagram of a hybrid battery of the invention having a "balanced-diode" circuit.

FIG. 5 shows an electrical schematic diagram of a hybrid battery 90 having a "balanced diode" circuit. Diode switching for voltage source selection, as provided by a power transition circuit, ordinarily involves a fairly substantial voltage drop when a diode is conducting, e.g., 0.5 volts. However, since such diode switching can provide low leakage currents, use of diode switching is highly desirable in certain applications. The hybrid battery 90 disclosed in FIG. 5 describes circuitry for compensating for the forward voltage drop in a forward-current-switching diode of the power transition circuit 93. As shown, the hybrid battery 90 comprises a rechargeable battery 91, such as a three-cell nickel cadmium battery, a primary battery 92, such as a lithium battery, and the main DC power source $V_{dc}$ tied to a load resistance $R_L$ via respective diode switches 93a, 93b, 93c of a power transition circuit 93. Note that the rechargeable battery 91 and the primary battery 92 are tied to the transition circuit 93 via respective current limiting resistors 94, 95. Primary battery enabling pins 96a, 96b are shown between the primary battery 92 and the respective current limiting resistor 95. The two primary battery enabling pins 96a, 96b must be shorted via a switch or a jumper in order for the primary battery 92 to be tied to the remainder of the circuit. These pins are used to conserve primary battery life prior to actual installation of the hybrid battery 90 and do not otherwise contribute to the operation of the battery 90.

The main DC power source $V_{dc}$ is tied to the transition circuit 93 via the input-output path of a voltage regulator 97. The output of the voltage regulator 97 is also tied to the positive terminal of the rechargeable battery 91 via an isolation diode 98 and a resistor 99 as well as to ground via an electrolytic capacitor 101. The voltage regulator 97 also has a ground pin which is tied to (a) ground through a diode 102 and (b) to the main DC power source $V_{dc}$ via a resistor 103. Note that both the input and output terminals for the hybrid battery 90 have ground capacitors 104 connected thereto.

In operation, the hybrid battery 90 operates in the same fashion as previously described. However, the diode switch 93c for the main DC power source $V_{dc}$, which is a forward-current-switching diode, is compensated for its forward voltage drop by the ground diode 102. As shown, the ground diode 102 raises the output of the voltage regulator 97 to provide sufficient voltage at point X of the hybrid battery 90 circuit to compensate for the aforementioned voltage drop. The ground diode 102 can be termed a "balancing diode". Such circuitry can also be used to tie the rechargeable battery 91 and the primary battery 92 to the power transition circuit 93 and thus provide similar compensation for the respective diode switching. Note that more than one "balancing diode" can be inserted in the circuit to enable the voltage regulator 97 to output sufficient compensating voltage for additional voltage drops in the transition circuit 93, for example, if the diode switch 93a associated with the rechargeable battery 91 were moved to be in series with the aforementioned diode switch 93c.

Figure 6:
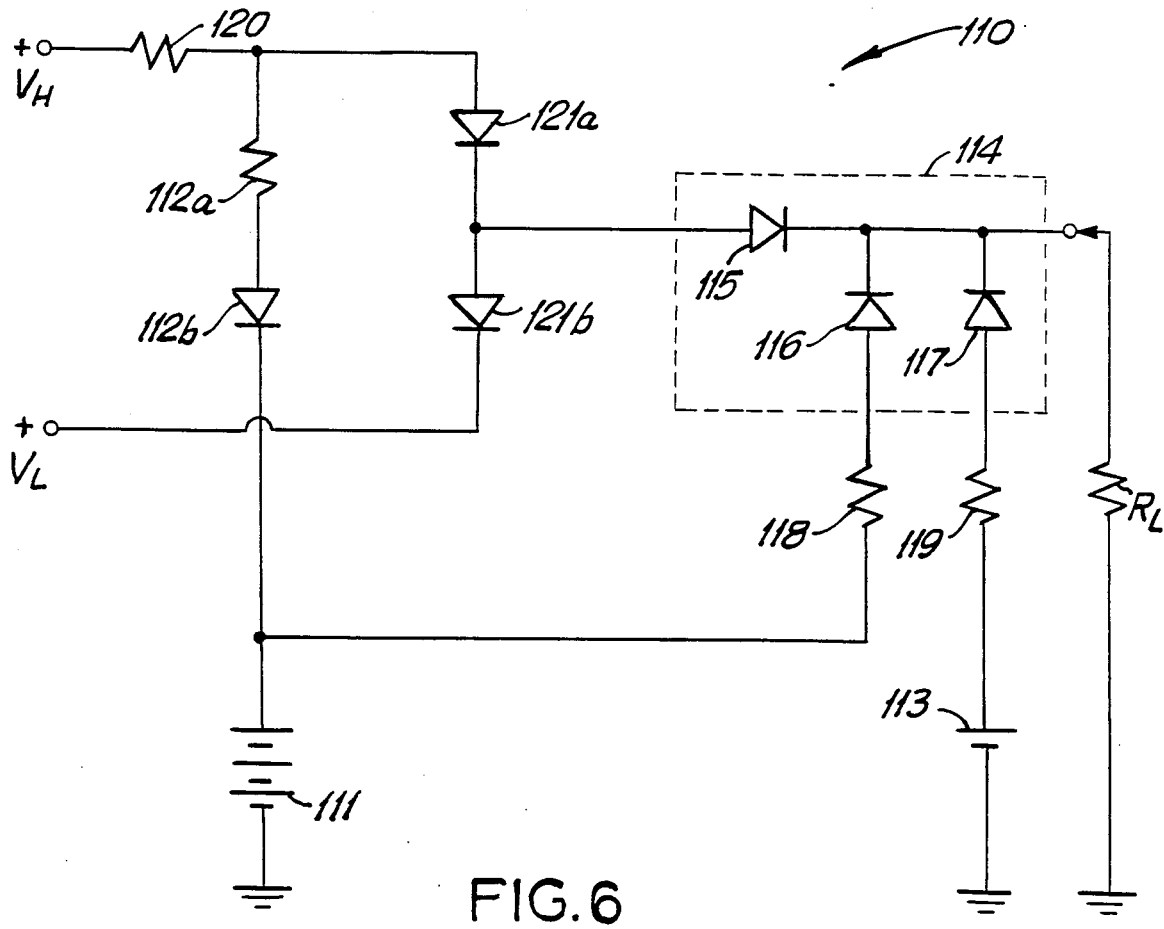
FIG. 6 is an electrical schematic diagram of a hybrid battery of the invention having a "balanced-diode" circuit and two main power sources.

FIG. 6 is an electrical schematic diagram of a hybrid battery 110 having a "balanced-diode" circuit for low voltage drop operation when two main DC power sources are utilized. The "balanced-diode" hybrid battery 110 has a dual input tied to a low DC power source $V_L$ (e.g., 5 volts) and a high DC power source $V_H$ (e.g., 12 volts) and an output tied to a load resistance $R_L$. The hybrid battery 110 comprises a rechargeable battery 111, such as a three-cell nickel cadmium battery, which is tied to the high DC power source $V_H$ via a charge controller circuit (shown as a resistor 112a and a diode 112b series), a primary battery 113, such as a lithium battery, and a power transition circuit 114. The power transition circuit 114 connects the two DC power sources, the rechargeable battery 111 and the primary battery 113 to the load resistance $R_L$ via respective diode switches 115, 116, 117. Note that the rechargeable battery 111 and the primary battery 113 are both tied to the power transition circuit 114 via respective current-limiting resistors 118, 119. As mentioned previously, the resistor 119 tied to the primary battery 113 may be excluded from the circuit.

The high DC power source $V_H$ is connected to the power transition circuit 114 via a source resistor 120 and a first balancing diode 121a. The low DC power source $V_L$ is tied to the power transition circuit 114 via a second balancing diode 121b. The two balancing diodes 121a, 121b form a "balanced-diode" circuit for the hybrid battery 110.

In operation, the "balanced-diode" hybrid battery 110 operates in the same fashion as previously described and, in addition, allows low voltage-drop operation involving only diodes and resistors. Given the low cost of these circuit elements, a very economical version of the hybrid battery 110 is thus possible which does not compromise input/output loss. The voltage at the circuit connection point of the source resistor 120 and the first balancing diode 121a is clamped two diode voltage drops above the low DC power source $V_L$, i.e. 5 volts, and assures sufficient charging potential for the rechargeable battery 111. The voltage at the circuit connection point of the two balancing diodes 121a, 121b is clamped one diode voltage drop above the low DC power source $V_L$ by the second balancing diode 121b. The second balancing diode 121b balances out the diode voltage drop of the DC power source diode switch 115, yielding a desired low overall voltage drop.

Thus, if the rechargeable battery 111 was to be removed during service, the output voltage across the load resistance $R_L$ would not rise to the high DC power source $V_H$ potential i.e., 12 volts, due to the clamping of that power source by the first balancing diode 121a. Note that electronic devices which may be coupled to the output and form the load resistance $R_L$, such as computer memories, tend to have maximum operating voltages and absolute maximum (withstand) voltages; thus, a good deal of leeway exists between a 5 volt, 5% tolerance DC power source and practical conditions for a battery changeover.

Figure 7:
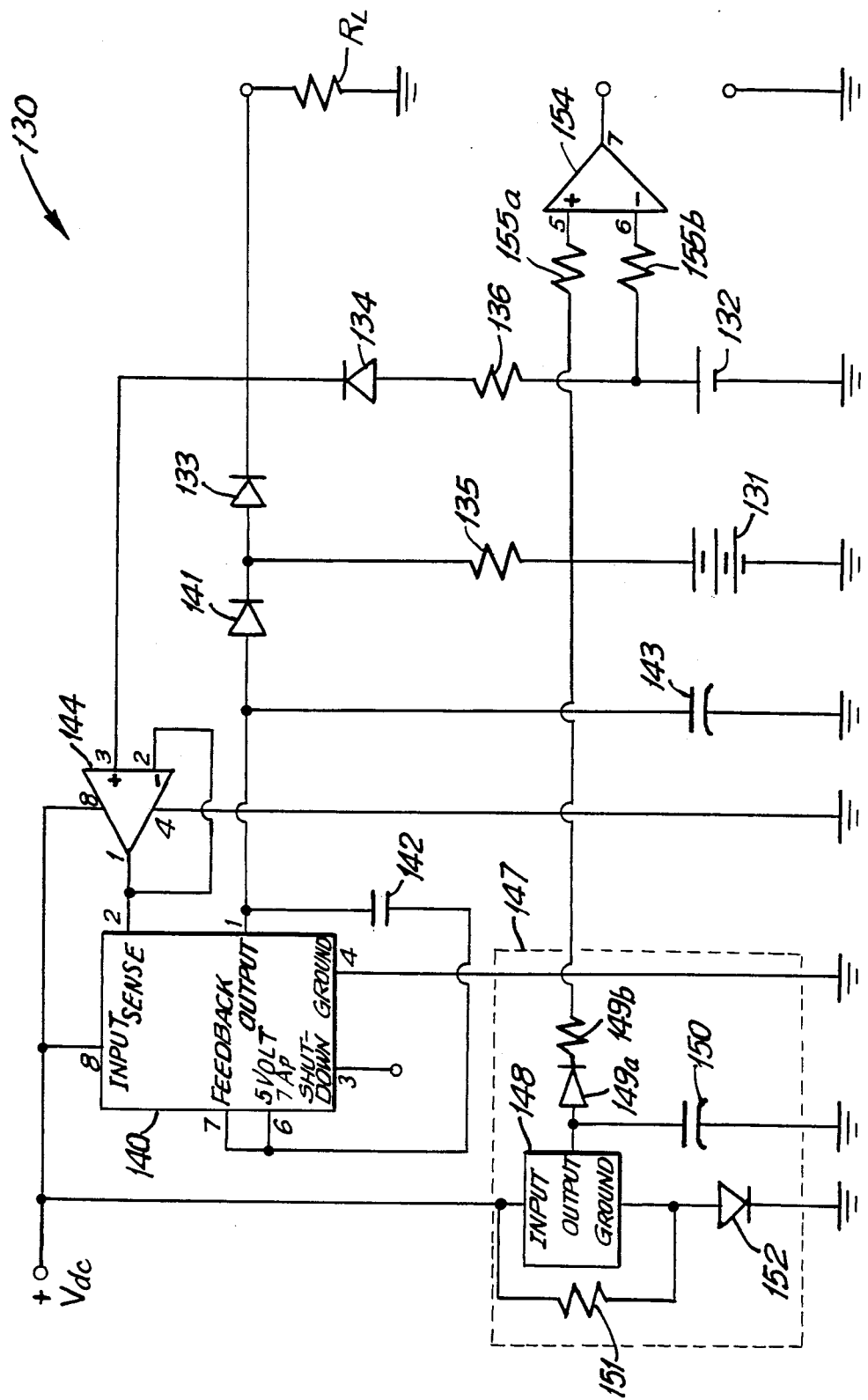
FIG. 7 is an electrical schematic diagram of a hybrid battery of the invention having a voltage source switching system utilizing negative feedback correction.

FIG. 7 shows an electrical schematic diagram of a hybrid battery 130 having negative feedback compensation for a portion of the voltage source switching system. As previously mentioned, diode switching involves a fairly substantial voltage drop when a diode is conducting. The hybrid battery 130 disclosed in FIG. 7 describes circuitry for compensating for the forward voltage drop in the forward-current-switching diodes of the power transition circuit. The circuitry can also compensate for voltage drops due to JFETS (which can be used advantageously in the embodiment of FIG. 7 as low-leakage diodes) or other impedances. As shown, the hybrid battery 130 comprises a rechargeable battery 131, such as a three-cell nickel cadmium battery, a primary battery 132, such as a lithium battery, and the main DC power source $V_{dc}$ all tied to a load resistance $R_L$. The two batteries 131, 132 are tied to the load resistance $R_L$ via respective diode switches 133, 134 of a power transition circuit (not delineated in FIG. 7). Note that the batteries 131, 132 are tied to the power transition circuit via respective current limiting resistors 135, 136.

The main DC power source $V_{dc}$ is connected to the load resistance $R_L$ via a negative feedback correction circuit within the power transition circuit. The main DC power source $V_{dc}$ is tied to the input terminal (pin 8) of a first voltage regulator 140. The output terminal (pin 1) of the first voltage regulator 140 is connected to a forward-current-switching diode switch 141 which is in turn tied to the diode switch 133 that is utilized by the rechargeable battery 131 for power transition. The first voltage regulator 140 also has the output terminal (pin 1) tied to a feedback terminal (pin 7) and a five (5) volt tap (pin 6) via a loop capacitor 142. Note that an electrolytic capacitor 143 is tied between ground and the output terminal (pin 1). Also note that the voltage regulator 140 has a shutdown terminal (pin 3) which can be tied to a shutdown sensor, such as a MOSFET-based circuit, that stops the operation of the regulator once the rechargeable battery 131 takes over the circuit from the main DC power source $V_{dc}$.

The first voltage regulator 140 also has a sense terminal (pin 2) which is tied to the output (pin 1) of a first operational amplifier (op amp) 144. The noninverting input (pin 3) of the first op amp 144 is tied to the load resistance $R_L$. The inverting input (pin 2) of the first op amp 144 is tied to the output (pin 1) of the same element to form a loop. The reference voltage (at pin 8) for the first op amp 144 is provided for by the main DC power source $V_{dc}$.

The rechargeable battery 131 is tied to the main DC power source $V_{dc}$ via a charge controller circuit 147. The charge controller circuit comprises a second voltage regulator 148 having an input terminal tied to the main DC power source $V_{dc}$ and an output terminal tied to the rechargeable battery 131 via a diode 149a—resistor 149b series. The output terminal is also tied to ground via an electrolytic capacitor 150. A shunt resistor 150 is tied between the input terminal and the ground terminal of the regulator 148. The ground terminal is tied to ground via a ground diode 152. Note, that in a sense, a second charge controller circuit for the rechargeable battery 134 exists via the current limiting resistor 135 and the diode switch 141.

Optionally, the rechargeable battery 131 can also be tied to the noninverting terminal (pin 5) of a second operational amplifier 154 via a first input resistor 155a while the primary battery 132 is tied to the inverting terminal (pin 6) of the same op amp 154 via a second input resistor 155b. The output of the second op amp 154 can then be used to indicate which of the batteries 131, 132 has the greater voltage at any given point in time. The first and second op amps 144, 154 can be dual op amps in the same eight (8) pin package.

In operation, the hybrid battery 130 operates in the same fashion as previously described. However, two of the forward-current-switching diodes 133, 141 are compensated for their respective forward voltage drops by the negative feedback circuit. The compensating feedback can be described in terms of the basic theory involved in negative feedback systems in general. Negative feedback can be achieved by using a feedback loop to divert a portion of a device's output, invert the output, and add the modified output signal to the input of the device. As the modified output signal and the input signal merge and pass through the device, any distortion originally in the input would be cancelled by the now-inverted distortion in the added output signal. The penalty for controlling distortion, however, is a loss of amplification by the device. Mathematically, the amplification gain of a device having negative feedback is $V_2/V_1 = A/(1+AB)$, where $V_2$ is the output voltage, $V_1$ is the input voltage, A is the device amplification (which may be variable value), and B is the feedback network function derived from, for example, a frequency selective network or a voltage divider. As can be seen, for very large values of A, the gain, $V_2/V_1 = 1/B$ which puts the device under the control of the feedback network.

In the embodiment shown in FIG. 7, the gain of the first voltage regulator 140 system is: $V_2/V_1 = G/(1+GH)$, where $V_2$ is the output voltage across the load resistance $R_L$, $V_1$ is the internal reference voltage of the first voltage regulator 140, G is the amplification or transfer function of the first voltage regulator 140, and H is the transfer function of the first op amp 144 which acts as the feedback network. As described previously, if the transfer function G of the first voltage regulator 140 is very large, the gain of the system is: $V_2/V_1 = 1/H$. Thus, by setting the transfer function H of the first op amp 144 equal to 1, the gain of the system is: $V_2/V_1 = 1$ and, therefore, $V_2 = V_1$.

The operation of the negative feedback correction circuit for compensating for the voltage drops of the two forward voltage diodes 133, 141 is clear from the foregoing. The main DC power source $V_{dc}$ might supply, for example, 5 volts to the load resistance $R_L$. However, due to the voltage drops of the diode switches in the power transition circuit, the load resistance would ordinarily receive a voltage less than 5 volts. With a negative feed back mechanism, the voltage that is received by the load resistance $R_L$ is also received by the first op amp 144 which has an approximately infinite input impedance (pin 3). The sense terminal (pin 2) of the first voltage regulator 140 also receives the voltage from the output of the first op amp 144 which acts as a voltage follower and just passes the voltage through. The first voltage regulator 140 then regulates a greater main DC power source $V_{dc}$ and outputs a voltage that will be compensated for the voltage drops that subsequently occur at the two diode switches 133, 141. As a result, the voltage across the load resistance will now be equal to the internal reference voltage supplied by the first voltage regulator 140, e.g., 5 volts.

Note that alternative methods for switching several sources would involve at least one high current switch for a hybrid battery 130 as shown. Even MOSFET's have drain-source leakages which increase as current carrying, at a given voltage drop, is increased. All such devices of course will have a voltage drop and it is clear that the system shown in FIG. 7 is not limited to use in correcting solely diode voltage drops but may be used in correcting voltage drops of any type of switching mechanism.

It is to be understood that the embodiments described herein are merely illustrative of the principles of the invention. Various modifications may be made thereto by persons skilled in the art without departing from the spirit and scope of the invention.

What is claimed is:

1. A hybrid battery which provides backup energy for at least one main power source connected to a load, comprising:
   a. a rechargeable first battery,
   b. a second battery,
   b. means for selectively connecting the at least one main power source, the rechargeable first battery, and the second battery to the connected load based on which energy source has the highest voltage available, said means for selectively connecting comprising at least one solid state switch which connects the rechargeable first battery to the connected load upon the loss of the at least one main power source, gradually connects the second battery to the connected load through load sharing with the rechargeable first battery upon the discharge of the rechargeable first battery below a predetermined voltage level, disconnects the rechargeable first battery upon the return of the at least one main power source, and disconnects the second battery upon the charging of the rechargeable first battery above the predetermined voltage level, said switch isolating the energy sources from one another; and
   d. means for compensating for the forward-voltage drop of the at least one solid state switch.

2. The hybrid battery of claim 1, wherein:
   the means for compensating comprises a voltage regulator circuit which ties at least one of the energy sources to the at least one solid state switch and which provides a voltage sufficient to overcome the forward-voltage drop of the at least one solid state switch.

3. The hybrid battery of claim 1, wherein:
   the means for compensating comprises a negative feedback circuit which ties at least one of the energy sources to the at least one solid state switch and which provides a voltage sufficient to overcome the forward-voltage drop of the at least one solid state switch.

4. A hybrid battery which provides a backup energy for at least one main power source connected to a load, comprising:
   a. a rechargeable first battery;
   b. a second battery;
   c. means for selectively connecting the at least one main power source, the rechargeable first battery, and the second battery to the connected load based on which energy source has the highest voltage available, said means for selectively connecting comprising a first diode tied between the at least one main power source and the connected load, a second diode tied between the rechargeable first battery and the connected load, and a third diode tied between the second battery and the connected load such that the diodes connect the rechargeable first battery to the connected load upon the loss of the at least one main power source, gradually connect the second battery to the connected load through load sharing with the rechargeable first battery upon the discharge of the rechargeable first battery below a predetermined voltage level, disconnect the rechargeable first battery upon the return of the at least one main power source, and disconnect the second battery upon the charging of the rechargeable first battery above the predetermined voltage level, said diodes isolating the energy sources from one another; and d. means for compensating for the forward-voltage drop of at least one diode of the at least one solid state switch.

5. The hybrid battery of claim 4, wherein:
the means for compensating comprises a voltage regulator circuit tied between the at least one diode and the associated energy source and which provides a voltage sufficient to overcome the forward-voltage drop of the at least one diode.

6. The hybrid battery of claim 4, wherein:
the means for compensating comprises a negative feedback circuit tied between the at least one diode and the associated energy source and which provides a voltage sufficient to overcome the forward-voltage drop of the at least one diode.

7. A hybrid battery which provides backup energy for at least one main power source connected to a load which comprises a first main power source and a second main power source of lesser voltage comprising:
   a. a rechargeable first battery;
   b. a second battery;
   c. means for selectively connecting the at least one main power source, the rechargeable first battery, and the second battery to the connected load based on which energy source has the highest voltage available, said means for selectively connecting comprising at least one solid state switch which connects the rechargeable first battery to the connected load upon the loss of the at least one main power source, gradually connects the second battery to the connected load through load sharing with the rechargeable first battery upon the discharge of the rechargeable first battery below a predetermined voltage level, disconnects the rechargeable first battery upon the return of the at least one main power source, and disconnects the second battery upon the charging of the rechargeable first battery above the predetermined voltage level, said switch isolating the energy sources from one another; and
   d. means for clamping the first main power source above the second main power source of lesser voltage and for compensating for the forward-voltage drop of the at least one solid state switch.

8. A hybrid battery which provides backup energy for at least one main power source connected to a load which comprises a first main power source and a second main power source of lesser voltage comprising:
   a. a rechargeable first battery;
   b. a second battery;
   c. means for selectively connecting the at least one main power source, the rechargeable first battery, and the second battery to the connected load based on which energy source has the highest voltage available, said means for selectively connecting comprising at least one solid state switch which connects the rechargeable first battery to the connected load upon the loss of the at least one main power source, gradually connects the second battery to the connected load through load sharing with the rechargeable first battery upon the discharge of the rechargeable first battery below a predetermined voltage level, disconnects the rechargeable first battery upon the return of the at least one main power source, and disconnects the second battery upon the charging of the rechargeable first battery above the predetermined voltage level, said switch isolating the energy sources from one another;
   d. means for automatically charging the rechargeable first battery from the at least one main power source during the time the load is connected to the at least one main power source and isolating the at least one main power source from draining the rechargeable first battery upon the loss of the at least one main power source; and
   e. means for clamping the first main power source above the second main power source of lesser voltage and for compensating for the forward-voltage drop of the at least one solid state switch.

9. A hybrid battery which provides backup energy for at least one main power source connected to a load which comprises a first main power source and a second main power source of less voltage comprising:
   a. a rechargeable first battery;
   b. a second battery;
   c. means for selectively connecting the at least one main power source, the rechargeable first battery, and the second battery to the connected load based on which energy source has the highest voltage available, said means for selectively connecting comprising a first diode tied between the at least one main power source and the connected load, a second diode tied between the rechargeable first battery and the connected load, and a third diode tied between the second battery and the connected load such that the diodes connect the rechargeable first battery to the connected load upon the loss of the at least one main power source, gradually connect the second battery to the connected load through load sharing with the rechargeable first battery upon the discharge of the rechargeable first battery below a predetermined voltage level, disconnect the rechargeable first battery upon the return of the at least one main power source, and disconnect the second battery upon the charging of the rechargeable first battery above the predetermined voltage level, said diodes isolating the energy sources from one another; and
   d. means for clamping the first main power source above the second main power source of lesser voltage and for compensating for the forward-voltage drop of the first diode.

10. A hybrid battery which provides backup energy for at least one main power source connected to a load which comprises a first main power source and a second main power source of lesser voltage comprising:
    a. a rechargeable first battery;
    b. a second battery;
    c. means for selectively connecting the at least one main power source, the rechargeable first battery, and the second battery to the connected load based on which energy source has the highest voltage available, said means for selectively connecting comprising a first diode tied between the at least one main power source and the connected load, a second diode tied between the rechargeable first battery and the connected load, and a third diode tied between the second battery and the connected load such that the diodes connect the rechargeable first battery to the connected load upon the loss of the at least one main power source, gradually connect the second battery to the connected load through load sharing with the rechargeable first battery upon the discharge of the rechargeable first battery below a predetermined voltage level, disconnect the rechargeable first battery upon the return of the at least one main power source, and disconnect the second battery upon the charging of the rechargeable first battery above the predetermined voltage level, said diodes isolating the energy sources from one another;

d. means for automatically charging the rechargeable first battery from the at least one main power source during the time the load is connected to the at least one main power source and isolating the at least one main power source from draining the rechargeable first battery upon the loss of the at least one main power source; and e. means for clamping the first main power source above the second main power source of lesser voltage and for compensating for the forward-voltage drop of the first diode.

11. A hybrid battery which provides backup energy for at least one main power source connected to a load which comprises a first main power source and a second main power source of lesser voltage comprising:
  a. a rechargeable first battery;
  b. a second battery;
  c. means for selectively connecting the at least one main power source, the rechargeable first battery, and the second battery to the connected load based on which energy source has the highest voltage available, said means for selectively connecting comprising a first diode tied between the at least one main power source and the connected load, a second diode tied between the rechargeable first battery and the connected load, and a third diode tied between the second battery and the connected load such that the diodes connect the rechargeable first battery to the connected load upon the loss of the at least one main power source, gradually connect the second battery to the connected load through load sharing with the rechargeable first battery upon the discharge of the rechargeable first battery below a predetermined voltage level, disconnect the rechargeable first battery upon the return of the at least one main power source, and disconnect the second battery upon the charging of the rechargeable first battery above the predetermined voltage level, said diodes isolating the energy sources from one another;
  d. at least one first clamping diode tied between the first main power source and the first diode; and
  e. at least one second clamping diode tied between the second main power source of lesser voltage and the first diode and which compensates for the forward-voltage drop of the first diode, said first main power source clamped a number of diode voltage drops above said second main power source equal to the number of clamping diodes.

12. A hybrid battery which provides backup energy for at least one main power source connected to a load which comprises a first main power source and a second main power source of lesser voltage comprising:
  a. a rechargeable first battery;
  b. a second battery;
  c. means for selectively connecting the at least one main power source, the rechargeable first battery, and the second battery to the connected load based on which energy source has the highest voltage available, said means for selectively connecting comprising a first diode tied between the at least one main power source and the connected load, a second diode tied between the rechargeable first battery and the connected load, and a third diode tied between the second battery and the connected load such that the diodes connect the rechargeable first battery to the connected load upon the loss of the at least one main power source, gradually connect the second battery to the connected load through load sharing with the rechargeable first battery upon the discharge of the rechargeable first battery below a predetermined voltage level, disconnect the rechargeable first battery upon the return of the at least one main power source, and disconnect the second battery upon the charging of the rechargeable first battery above the predetermined voltage level, said diodes isolating the energy sources from one another;
  d. means for automatically charging the rechargeable first battery from the at least one main power source during the time the load is connected to the at least one main power source and isolating the at least one main power source from draining the rechargeable first battery upon the loss of the at least one main power source; and
  e. at least one first clamping diode tied between the first main power source and the first diode; and
  f. at least one second clamping diode tied between the second main power source of lesser voltage and the first diode and which compensates for the forward-voltage drop of the first diode, said first main power source clamped a number of diode voltage drops above said second main power source equal to the number of clamping diodes.

13. A hybrid battery which provides backup energy for at least one main power source connected to a load, comprising:
  a. a rechargeable first battery;
  b. a second battery;
  c. means for selectively connecting the at least one main power source, the rechargeable battery, and the second battery to the connected load based on which energy source has the highest voltage available, said means for selectively connecting comprising a first diode tied between the at least one main power source and the connected load, a second diode tied between the rechargeable first battery and the connected load, and a third diode between the second battery and the connected load such that the diodes connect the rechargeable first battery to the connected load upon the loss of the at least one main power source, gradually connect the second battery to the connected load through load sharing with the rechargeable first battery upon the discharge of the rechargeable first battery below a predetermined voltage level, disconnect the rechargeable first battery upon the return of the at least one main power source, and disconnect the second battery upon the charging of the rechargeable first battery above the predetermined voltage level, said diodes isolating the energy sources from one another; and d. means for providing a regulated current to the rechargeable first battery with an extremely low voltage differential between the at least one main power source and the rechargeable first battery, said means automatically charging the rechargeable first battery from the at least one main power source during the time the load is connected to the at least one main power source and isolating the at least one main power source from draining the rechargeable first battery upon the loss of the at least one main power source.

14. The hybrid battery of claim 13, wherein:

the means for providing regulated current comprises (a) a current mirror circuit which provides a first current path from the at least one main power source for charging the rechargeable first battery and a second current path for supplying load current from the rechargeable first battery to the load, and (b) switch means for isolating the at least one main power source from draining the rechargeable first battery.

15. The hybrid battery of claim 13, wherein:

the means for providing regulated current comprises (a) a first common-emitter transistor having a collector tied to the cathode of the rechargeable first battery and, via a diode, to ground; (b) a second common-emitter transistor having a base tied to the base of the first common-emitter transistor and a collector tied to the least one main power source; and (c) switch means for isolating the at least one main power source from draining the rechargeable first battery.

16. The hybrid battery of claim 15, further comprising:

means for indicating that the rechargeable first battery is shorted.

17. The hybrid battery of claim 15, wherein: the switch means comprises a Schottky diode.

18. The hybrid battery of claim 15, wherein: the switch means comprises a transistor circuit.

19. The hybrid battery of claim 13, wherein:

the means for providing regulated current comprises (a) at least one current mirror circuit which provides a single current path for both the recharging of the rechargeable first battery from the at least one main power source and the supplying of load current from the rechargeable first battery to the load, and (b) switch means for isolating the at least one main power source from draining the rechargeable first battery.

20. The hybrid battery of claim 13, wherein:

the means for providing regulated current comprises (a) a first common-emitter transistor; (b) a second common-emitter transistor having a base tied to the base of the first common-emitter transistor and a collector tied to ground via a collector resistor, said first and second common-emitter transistors having the respective emitters connected to the at least one main power source; and (c) switch means for isolating the at least one main power source from draining the rechargeable first battery.

21. The hybrid battery of claim 20, wherein:

the switch means comprises a transistor having an emitter tied to the collector of the first common-emitter transistor of the current mirror and a collector tied to the anode of the rechargeable first battery.

22. The hybrid battery of claim 20, further comprising:

means for indicating that the rechargeable first battery is shorted.

* * * * *

UNITED STATES PATENT AND TRADEMARK OFFICE
CERTIFICATE OF CORRECTION

PATENT NO. : 4,851,756

DATED : July 25, 1989

INVENTOR(S) : David R. Schaller, et al.

It is certified that error appears in the above-identified patent and that said Letters Patent is hereby corrected as shown below:

| Column | Line | |
|---|---|---|
| Abstract | 4 | Please delete "transistion" and insert therefore --transition--. |
| 1 | 40 | Please delete "in" and insert therefore --there are-- |
| 9 | 52 | Please delete "sense" and insert therefore --sensing--. |
| 12 | 26 | Please delete "less" and insert therefore --lesser--. |
| 15 | 4 | Please delete "a". |

Signed and Sealed this

Twelfth Day of June, 1990

Attest:

HARRY F. MANBECK, JR.

*Attesting Officer*     *Commissioner of Patents and Trademarks*